July 13, 1965  W. SWAROFSKY ETAL  3,194,134
PHOTOGRAPHIC CAMERA WITH ELECTRICAL EXPOSURE METER
Filed Sept. 13, 1962  3 Sheets-Sheet 1

INVENTORS
WALTER SWAROFSKY
FRITZ RENNEBERG
BY Blum, Moscovitz,
Friedman & Blum

ATTORNEYS.

July 13, 1965  W. SWAROFSKY ETAL  3,194,134
PHOTOGRAPHIC CAMERA WITH ELECTRICAL EXPOSURE METER
Filed Sept. 13, 1962  3 Sheets-Sheet 2

FIG.2

INVENTORS
WALTER SWAROFSKY
FRITZ RENNEBERG
BY Blum, Moscovitz,
   Friedman & Blum
ATTORNEYS.

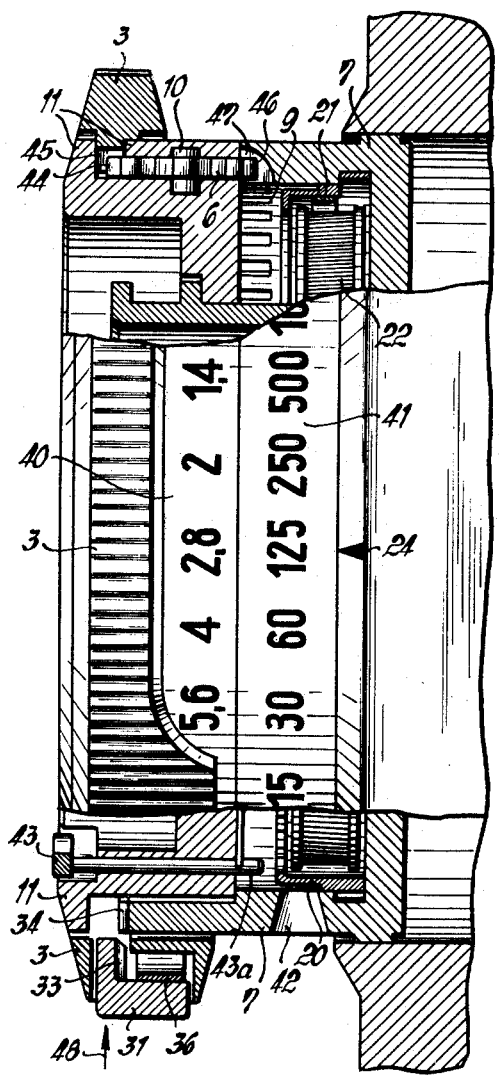

United States Patent Office 3,194,134
Patented July 13, 1965

3,194,134
PHOTOGRAPHIC CAMERA WITH ELECTRICAL
EXPOSURE METER
Walter Swarofsky and Fritz Renneberg, Braunschweig,
Germany, assignors to Voigtländer A.G., Braunschweig,
Germany, a corporation of Germany
Filed Sept. 13, 1962, Ser. No. 223,461
Claims priority, application Germany, Sept. 30, 1961,
V 21,393
10 Claims. (Cl. 95—10)

This invention relates to photographic cameras equipped with exposure meters of the type having a photo-resistance cell, connected in a bridge circuit including a voltage divider resistance having an adjustable tap, and a moving coil instrument of the null balance type connected across the bridge circuit and to the adjustable tap, with the resistance of the cell being influenced by the setting of an objective diaphragm. More particularly, the present invention is directed to a camera of this type including novel means for effecting coordinated adjustment of a diaphragm aperture setter, a shutter time setter, and the adjustable tap of the voltage divider resistance.

One of the problems encountered in the design of cameras of the mentioned type, is that of providing setting means for effecting coordinated adjustment of the diaphragm aperture setting and the shutter time setting in accordance with the reading of the exposure meter, or in accordance with the value of an exposure condition determined from the exposure meter. The problem is accentuated when it is attempted to provide such a simple setting means whereby, after initial adjustment of the time setting, the diaphragm aperture is adjusted and, when the diaphragm reaches its limit of movement in either direction, as when it is fully opened or fully closed, the shutter time is then re-adjusted, all by operation of a single setting means.

In accordance with the present invention, this problem is solved by providing a setting device and differential gearing interconnecting the setting device, the diaphragm aperture setter, and the shutter time setter, as well as means adjustably coupling the adjustable tap of the voltage divider to the shutter time setter for conjoint movement with the latter. The differential gearing preferably includes facing gear teeth formed on the setting device and on the shutter time setter and meshing with a pinion which is rotatable on an axis fixed to the diaphragm aperture setter.

Preferably, a film sensitivity setting element is adjustably connected to the shutter time setter or ring so that the film sensitivity may be set first, with reference to cooperating scale and indicator means on the film sensitivity setting element and on the shutter time setter, to initially adjust the adjustable contact or tap of the voltage divider relative to the shutter time setter, the thus adjusted coupling between the film sensitivity setting means and the shutter time setter remaining fixed thereafter until purposely re-set. Preferably, the connection between the film sensitivity setting element and the shutter time setter requires special manipulation in order to re-set the film sensitivity indication. This may be done by making the film sensitivity setting element adjustable with reference to a window, an indicator, or the like which is fixed on the shutter time setting ring. It is also preferable that the film sensitivity setting means be a contact spring constituting the adjustable tap and sliding along the voltage divider resistance.

For an understanding of the principles of the invention, reference is made to the following description of typical embodiments thereof as illustrated in the accompanying drawings. In the drawings:

FIG. 2 is a somewhat schematic illustration of a coupling arrangement in accordance with the present invention;

FIG. 3 is a part side elevational view and part sectional view of coordinated exposure condition adjusting means embodying the invention;

Figure 1:
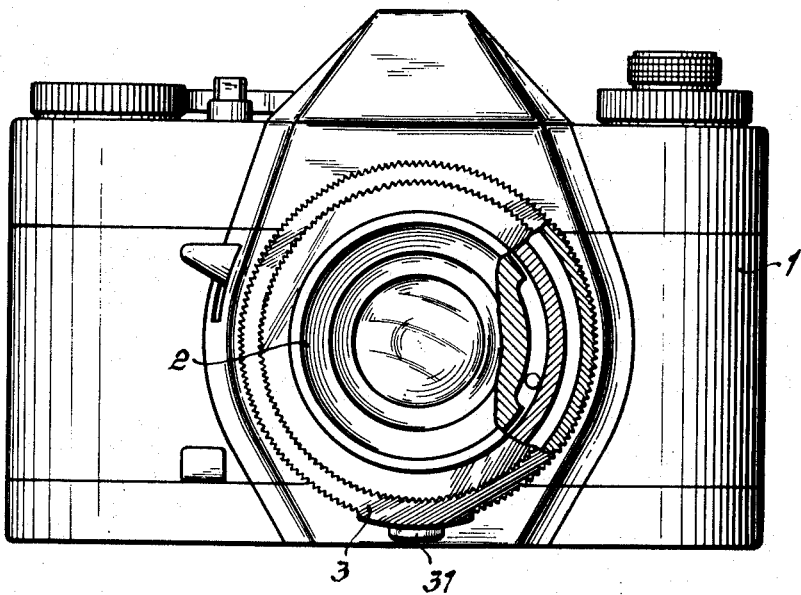
FIG. 1 is a front elevational view, partly in section, of a photographic camera embodying the invention.

Referring to FIG. 1, a photographic camera 1 is illustrated as provided with an objective mount in which is disposed an objective 2 which has a setting ring 3 coaxially and adjustably mounted thereon and provided with a selectively operable element 31. The diaphragm setter and the shutter time setter may be mounted inside the shutter casing, on the objective, or within the camera. Objective 2 is preferably interchangeable.

Referring to FIG. 2, the knurled setting device or ring 3, as well as a shutter time setter or ring 7, are provided with facing gear teeth such as 8 and 9, respectively engaged with the teeth of a pinion 6 which is rotatable upon a shaft or pivot 10 secured in fixed position on a diaphragm setter 11. With the illustrated arrangement, an adjustment of setting device 3 effects adjustment of diaphragm setter 11 as well as of time setter 7. The diaphragm setter 11 is preferably provided with coupling means, such as lugs 12, which will actuate the iris diaphragm of the objective which, in FIG. 2, is illustrated as an interchangeable objective 13. Each of the interchangeable objectives is formed with a recess 14 having an arcuate length corresponding to the range of movement of its iris diaphragm between the minimum and maximum openings.

Time setter 7 is provided or formed with other rack teeth 15 which are meshed with a pinion or gear 16 for setting either the braking device of a central shutter or the slot width of a slotted shutter. Also, time setter 7 is formed with detent grooves 17 cooperable with a ball 18 which is biased by a spring 19 to seat in the recesses 17, so that ball 18, in cooperation with recesses 17, will releasably maintain time setter 7 in adjusted position.

A film sensitivity setting element 20 is adjustably connected with, or mounted on, the time setter 7, the means connecting the film sensitivity setting element to shutter time setter 7 preferably being of such a nature as to maintain these two parts locked in adjusted relation until such time as it is desired to re-set the film sensitivity value. Film sensitivity setting element 20 carries a contact spring 21 which constitutes the adjustable tap of a voltage divider resistance 22 included in the aforementioned bridge circuit, contact 21 being connected to the aforementioned moving coil instrument. Adjustment of film sensitivity setting element 20 with reference to time setter 7 is illustrated as effected with the aid of a scale on member 20 cooperating with a fixed mark 23, which may be a viewing window, of ring or setter 7.

Preferably, setting element 20 is so arranged that it is inaccessible during normal use of a camera when the camera has been loaded, so that the film sensitivity setting may not be changed as, for example, when the objective lens is interchanged. Thus, during use of the camera, after it has been loaded and with the selected objective 13 coupled thereto, contact spring 21 is adjusted along the voltage divider resistance 22 by turning time setter ring 7.

The arrangement illustrated in FIG. 2 operates in the following manner. In the illustrated arrangement, wherein time setter ring 7 is maintained in adjusted position through the medium of notches or recesses 17 interengaged with spring pressed ball 18, the force or pressure with which elements 17, 18 maintain time setter ring 7 in adjusted position is greater than the resistance to movement of diaphragm setter 11. An interchangeable objective 13 is then mounted on the camera so that the lug 12 of diaphragm setter 11 will be engaged in recess 14 so that the movement of diaphragm setter 11 is limited to the range determined by the length of recess 14 and corresponding to the range of movement of the iris diaphragm in objective 13.

By observing the reading of the film sensitivity scale on element 20 with reference to indicator mark or window 23, element 20 may be adjusted relative to time setter 7. This will correspondingly adjust spring 21 relative to voltage divider resistance 22.

Time setter 7 then can be adjusted to a position corresponding to the indications of the exposure meter, and is held in the adjusted position by means of spring pressed ball 18 engaging in a recess or notch 17. Adjustment of the time setting is effected with respect to a stationary index mark or the like 24, which also acts as a stationary index mark for adjustment of the diaphragm aperture. Such adjustment of time setter 7, through the medium of rack teeth 15 and pinion 16, adjusts the braking device of a central shutter camera or adjusts the slot width of a slotted shutter camera. If device 3 is now adjusted, pinion 6, rolling along rack teeth 9 of setter 7, will effect adjustment of diaphragm setter 11 to open or close the diaphragm of objective 13.

When the diaphragm is either fully opened or fully closed, lug 12 will engage one end or the other end edges 29 of recess 14 so that further movement of diaphragm setter 11 in a particular direction is arrested. As a result, pivot 10 of pinion 6 remains fixed in position with relation to the camera so that, if setting device 3 is adjusted further in the same direction, pinion 6 will rotate about its now fixed axis 10, such rotation being resisted in accordance with the strength of spring 19 pressing ball 18 into a recess 17 of setter 7. By the differential gearing thus described, the time setter 7 is then adjusted for longer or shorter time periods.

More specifically described, the operation of the arrangement shown in FIG. 2 may be set forth as follows. If ring 3 is moved in the direction of arrow 25, pinion 6 will rotate in the direction of arrow 26 so that it will roll along rack teeth 9 and thus move diaphragm setter 11 in the direction of arrow 27. This movement of diaphragm setter 11 continues until edge 28 of lug 12 engages edge 29 of recess 14 in objective 13. Further travel of diaphragm setter 11 in this direction is thus arrested, and diaphragm setter 11 is locked at the value "22" which is now opposite stationary index 24.

Upon further movement of setting device 3 in the direction of arrow 25, pinion 6, rotating about the now stationary shaft pivot, adjusts time setter 7 in the direction of arrow 30 and in the direction of shorter time intervals. The shutter time is thus adjusted in accordance with the indicated illumination value read from the exposure meter.

The arrangement of FIG. 2 also includes means for directly coupling setting device 3 and shutter time setter 7. This comprises a handle or operator 31 on a coupling member 32 which may be mounted in a slot or aperture through setting device 3. Coupling member 32 has rack teeth 33 which may be meshed with rack teeth 34 on shutter time setter 7. When handle or operator 31 is pressed to move coupling member 32 in the direction of arrow 35, and in opposition to a compression spring 36, setting device 3 is rigidly coupled with time setter 7 for conjoint movement of these two elements. As a consequence of this rigid coupling, diaphragm setter 11 is also rigidly coupled with time setter 7 since, with setting device 3 and shutter time setter 7 thus interengaged and rigidly interconnected, pinion 6 can no longer rotate relatively to either setting device 3 or shutter time setter 7.

It will be understood that diaphragm adjusting arrangement could alternatively be of the type in which, upon actuation of the shutter release, the diaphragm of objective 13 will be moved from its open position to a value determined by the relative position and interrelation of lug 12 of diaphragm setter 11 and notch 14 of objective lens 13.

FIG. 3 illustrates a practical embodiment of the invention. In this embodiment, setting device 3 is a ring which is mounted coaxially of an objective mount with its supported operator 31 being accessible from the exterior of the objective mount. Diaphragm scale 40 and time scale 41 are provided on rings 11 and 7, respectively, and may be set with reference to fixed index 24. Time setter ring 7 is mounted in coaxial relation with the knurled setting device ring 3 and is formed with a window 42 through which setting ring 20 for the film sensitivity may be observed. As can be seen from the upper portion of FIG. 3, ring 20 supports spring contact 21 sliding along a wound annular voltage divider resistance 22 within the objective mount.

An operator 43, including a pin 43a, is slidably mounted through the diaphragm ring 11 so that the pin 43a may be engaged in apertures or the like in ring 20 in order to set the film sensitivity. To set the film sensitivity, handle 43 is pushed in, and, while it is held stationary and pushed in, setting device 3 is turned a sufficient amount so that the desired film sensitivity reading appears in the window 42 of time setting ring 7. Operator 43 is then retracted.

Pinion 6, forming part of the differential gearing interconnecting setting device 3, ring 7 and ring 11, is rotatably mounted within the diaphragm setter ring 11, and meshes, at a point 44, with rack teeth 45 on ring 3 and, at a point 46, with rack teeth 47 on ring 7. Thus, the differential gearing operates in the same manner as described for the arrangement of FIG. 2.

The operating means 31 is provided with a geared segment 33 which, when handle 31 is pushed inwardly in the direction of arrow 48, engages rack teeth 34 on time setter ring 7. A leaf spring 36 biases handle 31 outwardly. When handle 31 is depressed, the setting device ring 3 and the time setter ring 7 are rigidly interconnected for conjoint movement. Thus, all three of the setting devices are rigidly interconnected for such conjoint movement due to resultant locking of the differential gearing.

Figure 4:
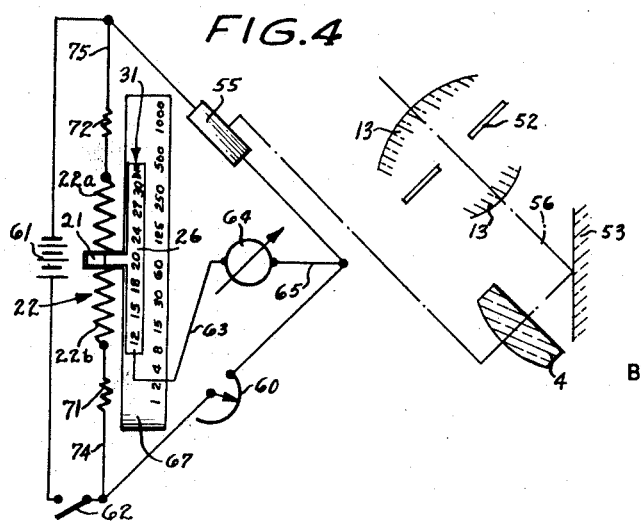
FIG. 4 shows a bridge circuit capable of being used with the structure of the invention.

Referring to FIG. 4, there is schematically illustrated therein the objective 13 provided with the diaphragm 52. The usual mirror 53 is provided for deflecting rays entering through the objective to the viewfinder, during sighting of the camera prior to taking an exposure. The setting plate of the viewfinder is schematically illustrated at 54. This element may merely be a viewfinder plate or may be a field lens. The photocell 55 is positioned opposite the finder setting plate or field lens 54, so that it is in the path 56 of light rays entering through the objective 13. Alternatively, the photo-sensitive cell 55 may be movable into and out of the field of view of the viewfinder.

Cell 55, which is a photoresistance cell, is incorporated in a Wheatstone bridge including the resistances 22a and 22b which form the voltage divider resistance 22 referred to above, and a proportioning of the total resistance is determined by the slide-contact or tap 21. A suitable source of potential is indicated at 61 as connectable across the series connected potentiometer 22 and the associated resistances 71 and 72 by means of a selectively operable switch 62. The tap 21, which is adjustable along the voltage divider resistance 22, is electrically connected through a conductor 63 with an indicating instrument such as a moving coil instrument 64, preferably designed as a null balance type instrument. The other lead 65 of the instrument 64 is connected to the junction point of the bridge arms including, respectively, photocell 55 and adjustable compensating resistance 60.

While specific embodiments of the invention have been shown and described in detail to illustrate the application of the principles of the invention, it will be understood that the invention may be embodied otherwise without departing from such principles.

What is claimed is:

1. For use in a photographic camera of the type equipped with an exposure meter having a photo-resistance cell, connected in a bridge circuit including a voltage divider resistance having an adjustable tap, and having a moving coil instrument of the null balance type connected across the bridge circuit and to the adjustable tap, the resistance of the cell being influenced by the setting of an objective diaphragm: the combination comprising an externally accessible manually adjustable setting device; an adjustable diaphragm aperture setter; an adjustable shutter time setter; differential gearing interconnecting said setting device, said diaphragm aperture setter, and said shutter time setter for interdependent operation of said diaphragm aperture setter and said shutter time setter by said setting device; means releasably retaining said shutter time setter in adjusted position; means positively limiting the range of movement of said diaphragm aperture setter; whereby, upon adjustment of said setting device, said diaphragm setter will be adjusted within its limited range of movement and, at either end of said range, said diaphragm aperture setter will remain stationary so that adjustment of said setting device will effect movement of said shutter time setter; a mounting means for such adjustable tap; and means adjustably coupling said mounting means to said shutter time setter for conjoint movement with the latter.

2. In a photographic camera having the combination claimed in claim 1, an objective mount arranged to interchangeably receive objectives each having an objective diaphragm; said limiting means comprising each objective having, on its inner end engageable in said mount, a formation physically correlated with the range of movement of its diaphragm between the fully open and fully closed positions; said diaphragm aperture setter having formation engaging means thereon interengageable with said formation when an objective is mounted in said objective mount, whereby the range of movement of said diaphragm aperture setter is limited to the range of movement of the diaphragm, of the particular objective mounted in said objective mount, between its fully open and fully closed positions.

3. In a photographic camera having the combination as claimed in claim 2, said objective formation comprising an elongated recess in the inner end of said objective; said formation engaging means comprising a lug on said diaphragm aperture setter engageable in said recess upon mounting of the objective in said objective mount.

4. In a photographic camera having the combination claimed in claim 1, interengageable coupling means respectively fixed relative to said setting device and said shutter time setter and operable, when interengaged, to rigidly couple said setting device and said shutter time setter for conjoint movement and to lock said differential gearing.

5. In a photographic camera having the combination claimed in claim 4, means biasing said interengageable coupling means to the disengaged position.

6. In a photographic camera having the combination claimed in claim 1, said mounting means comprising a film sensitivity adjusting element adjustably mounted on said shutter time setter for longitudinal adjustment relative thereto by reference to cooperating scale and fixed indicia means on said element and said time setter.

7. In a photographic camera having the combination claimed in claim 6, said element being releasably retained in its adjusted position on said shutter time setter against inadvertent relative displacement during movement of said shutter time setter.

8. In a photographic camera having the combination claimed in claim 1, said camera having an objective mount arranged to interchangeably receive objectives each provided with an objective diaphragm; said adjustable setting device, said diaphragm aperture setter, and said adjustable shutter time setter comprising rings mounted coaxially of said objective mount; said diaphragm aperture setter ring carrying a scale of diaphragm settings and said shutter time setter ring carrying a scale of time settings; and a reference mark fixed relative to said shutter mount and cooperable with both of said scales.

9. In a photographic camera having the combination claimed in claim 8, said limiting means comprising the inner end of each objective having an elongated recess therein corresponding, in length, to the range of movement of its diaphragm between the fully open and fully closed positions; said diaphragm aperture setting ring having a lug engageable in said recess upon mounting of an objective in said objective mount to limit movement of said diaphragm aperture setter ring to a range corresponding to the range of movement of the diaphragm of the particular objective mounted in said objective mount; said releasable means for maintaining said time setting setter ring in adjusted position comprising a detent engageable in recesses in an edge of said time setter ring, and a spring biasing said detent into such engagement; the force of said spring being such that, upon initial adjustment of said time setter ring followed by adjustment of said diaphragm setter ring by said setting device ring, and when the movement of said diaphragm setter ring is limited by engagement of its abutment with either end of said recess, said spring will provide release of said detent from its engaged recess for movement of said time setter ring through said differential gearing responsive to further similar movement of said setting device.

10. In a photographic camera having the combination claimed in claim 6, means carried by said diaphragm aperture setter and selectively engageable with said film sensitivity adjusting element for adjustment of the latter by movement of said setting device with said shutter time setter held stationary.

References Cited by the Examiner

UNITED STATES PATENTS

| | | | |
|---|---|---|---|
| 2,573,729 | 11/51 | Rath | 95—10 |
| 2,592,035 | 4/52 | Jacoby | 95—10 |
| 2,975,687 | 3/61 | Greger | 95—10 |
| 2,997,936 | 8/61 | Starp | 95—10 |
| 3,008,394 | 11/61 | Ohashi | 95—10 |

NORTON ANSHER, *Primary Examiner.*

DELBERT B. LOWE, *Examiner.*